United States Patent
Sztankay

[11] 3,891,966
[45] June 24, 1975

[54] AUTOMOBILE COLLISON AVOIDANCE LASER SYSTEM

[76] Inventor: Zoltan G. Sztankay, 4450 S. Park Ave., No. 802, Chevy Chase, Md. 20015

[22] Filed: Aug. 8, 1974

[21] Appl. No.: 495,746

[52] U.S. Cl. .................. 340/53; 340/32; 180/98
[51] Int. Cl. ............................................. B60t 7/12
[58] Field of Search...... 340/31 R, 32, 33, 34, 52 R, 340/53; 180/98, 103; 246/167 D; 250/215

[56] References Cited
UNITED STATES PATENTS

| | | | |
|---|---|---|---|
| 2,896,089 | 7/1959 | Wesch | 340/34 X |
| 3,365,572 | 1/1968 | Strauss | 340/33 UX |
| 3,442,347 | 5/1969 | Hodgson et al. | 340/53 X |

*Primary Examiner*—Alvin H. Waring
*Attorney, Agent, or Firm*—Nathan Edelberg; Robert P. Gibson; Saul Elbaum

[57] ABSTRACT

An apparatus is provided for the avoidance of rear end collisions between cars by providing a laser transmitting and receiving system and a detection system mounted on the front and rear of automobiles. Each car is equipped with a transmitter and receiver located at its rear end as well as at its front end. The transmitter at the front end emits a signal having a designated wavelength $f_1$ and the receiver at the front end receives signals having a designated wavelength $f_2$. The wavelengths of the transmitter and receiver at the rear end are the reverse of those at the front end. Upon reception of signals of wavelength $f_1$ the modulator at the rear end of a leading car would activate the transmitter which would send a return signal of wavelength $f_2$ to the receiver at the front end of the trailing car. This signal is interpreted by circuits in the receiver and furnishes a warning of the proximity of the vehicles.

5 Claims, 2 Drawing Figures

AUTOMOBILE COLLISON AVOIDANCE LASER SYSTEM

RIGHTS OF THE GOVERNMENT

The invention described herein may be manufactured, used, and licensed by or for the United States Government for governmental purposes without the payment to the inventor of any royalty thereon.

BACKGROUND OF THE INVENTION

This invention relates to laser systems and particularly to automobiles equipped with laser ranging systems and methods using these systems, for preventing collisions between similarly equipped automobiles.

DESCRIPTION OF THE PRIOR ART

It is estimated that billions of dollars are lost in the United States every year because of rear end auto collisions. Highway traffic statistics reveal that one of the major causes of automobile accidents is that of following too closely behind the vehicle ahead. Traffic laws prohibiting close following have been in effect for years but do not hold the answer because persons are not always conscious of their violations or are unable to judge the minimum distance necessary for safety at different speeds.

The inherent problem with other auto collision avoidance systems is their use of electromagnetic RF radiation to sense other cars. This gives rise to their inability to differentiate an automobile from safe objects such as overhead signs or from radiation reflected by cars approaching in the opposite direction. These problems are common to all radio frequency radar systems as well as to analagous acoustical systems.

A broad object of the present invention is to provide a practical and effective warning system which is not subject to false signals due to reflection of harmless road side objects.

Still another object of this invention is to provide a low cost system which is so designed that it cannot be blinded by radiation from oncoming similarly equipped vehicles.

A related object is to provide such a system in a manner which utilizes existing display or indicator subsystems to provide the warning signals to the trailing motorist or trailed motorist.

These and other objects of the present invention will become more fully apparent with reference to the following specification and drawings which relate to several preferred embodiments of the invention.

SUMMARY OF THE INVENTION

Briefly, an apparatus is provided for the avoidance of rear end collisions between cars by providing a laser transmitting, receiving and detection system comprised of optics and optical filters on cars. Each car is equipped with a transmitter and receiver located at its rear end as well as at its front end. The transmitter at the front end emits a signal having a wavelength $f_1$ and the receiver of the front end receives signals having a wavelength $f_2$. The wavelengths of the transmitter and receiver at the rear end are the reverse of those at the front end. In operation, the transmitter of the trailing car transmits a signal of wavelength $f_1$. Provided the leading car is within a prespecified range these signals are received by the receiver of the leading car. Upon reception of signals of wavelength $f_1$, the modulator of the leading car is activated and its transmitter is turned on. This causes a signal of wavelength $f_2$ to be transmitted to the receiver of the trailing car which only receives the wavelength $f_2$. This signal is interpreted by circuits in the receiver and furnishes a warning of the proximity of the vehicles to each other or activates automatic braking.

BRIEF DESCRIPTION OF THE DRAWINGS

The specific nature of the invention as well as other objects, aspects, uses and advantages thereof will clearly appear from the following description and from the accompanying drawings, in which:

Referring to FIG. 1, the system of the subject invention uses laser beams 15 and 16 to sense the proximity of a leading car 14 to a trailing car 13. The front end of the trailing car has a laser radiating at a first wavelength $f_1$ and a receiver sensitive to a different wavelength $f_2$. On the rear end there is located a receiver sensitive to $f_1$, and a laser capable of radiating at the wavelength $f_2$.

Figure 1:
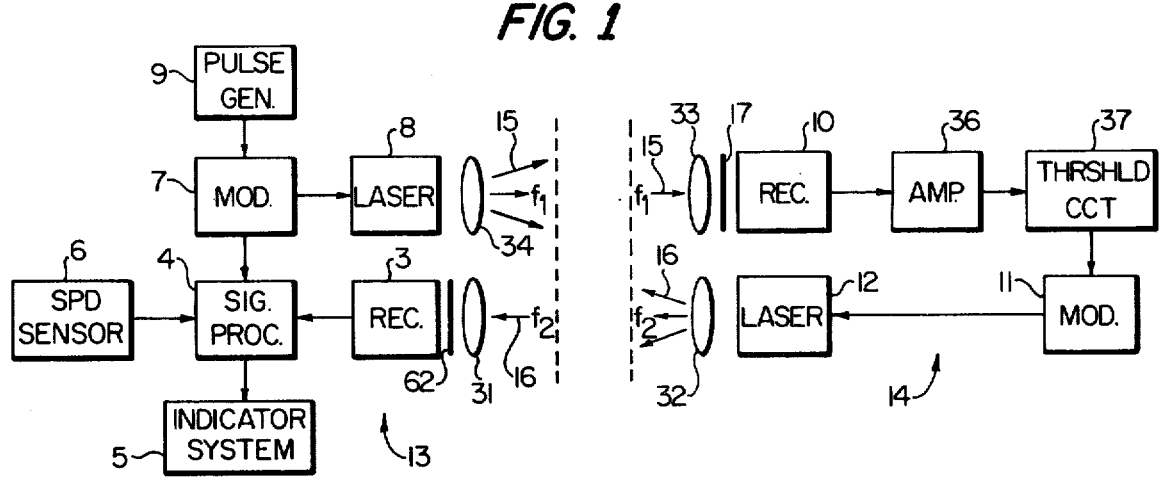
FIG. 1 is a block diagram of the front end system and of the rear end system.

Referring specifically to the front end system 13 of the trailing car in FIG. 1, the laser 8 operating at $f_1$ is pulsed at a high enough rate by the modulator 7 and pulse generator 9 and at a short enough pulse width to be consistent with the range of distances and closure velocities encountered in automobiles today. Pulse rate is governed specifically by pulse generator 9. If a leading car having the rear end system 14 is within the optical range of the laser 8, it receives the signal 15. This signal is then used, after any necessary amplification by amplifier 36, to pulse the modulator 11 of laser 12 if the signal is of sufficient intensity to pass threshold circuit 37. This laser then radiates in the backward direction at the wavelength $f_2$ toward the trailing car. Signal 16 is then received and gathered by the optics 31 of the system 13 which is designed to be sensitive to the wavelength $f_2$.

The signal 16 received by the receiver 3 in the trailing car is applied to a signal processor 4 which also receives an input signal from the modulator 7 and an input from speed sensor 6. This enables the signal processor to determine the range as well as the closure velocity of the leading car. A suitable alarm 5 or the activation of the vehicle braking system takes place when the distances or closure velocities fall outside of predetermined limits.

Injection lasers are preferred for the invention. The front end laser is preferably a gallium arsenide laser diode with an operating wavelength at approximately 900 nanometers. The rear end laser is preferably a gallium aluminum arsenide laser diode operating at a wavelength of approximately 800 nanometers. The preferred detector with both the front end and rear end receivers is a silicon photodiode. Optical filters 17 and 62 are used in conjunction with the photodiodes to make the one on the rear end sensitive to $f_1$ but not $f_2$, and the one on the front end sensitive to $f_2$ and not $f_1$. The filters also reject background light intensity from reflected sunlight, headlights, and other sources. Lenses 31, 32, 33 and 34 are used in conjunction with the lasers and photodetectors to focus the beam onto the detectors.

Reflection of the pulses on the front end laser at $f_1$ from overhead signs and other objects, cannot be received by the front end receiver because it is not sensitive to $f_1$. Accordingly, the interference problem is eliminated. Moreover, an oncoming car similarly equipped radiates at $f_1$ and does not operate to blind the front end receiver which rejects that particular wavelength.

Utilizing a small 10 watt peak power laser, at a range of 100 meters, a 5 meter by 2 meter spot may be effectively flooded with an energy density of about $10^{-4}$ watts/cm$^2$. Arranging the photodetector to cover a field of view equivalent to the transmitter divergence, the background intensity from reflected sunlight is approximately $4 \times 10^{-7}$ watts/cm$^2$ utilizing a 100 nanometer bandwidth filter. A receiver having a 1 cm$^2$ receiver area and a 50 megahertz bandwidth has a signal-to-noise ratio of over $10^4$ or 1000 times that required for reliable detection.

Figure 2:
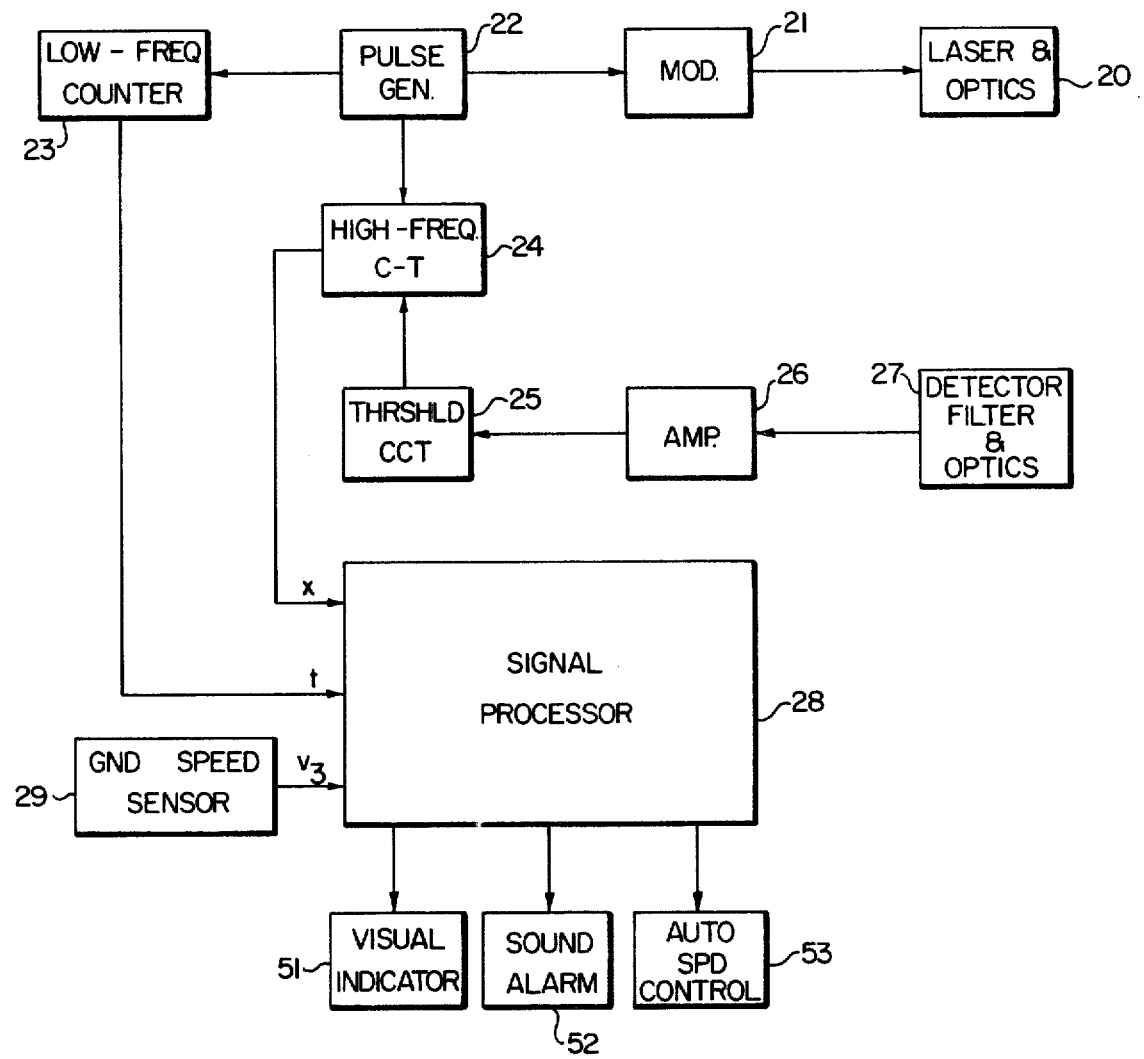
FIG. 2 is a block diagram of an alternative front end system.

An alternative front end system is shown generally in FIG. 2. The transmitter 20 on this front end is designed to have a beam pattern with the above specified power density at 100 meters. The laser 20 is placed at the focal point of a 5 mm focal length lens having a rectangular slit that is centered on and parallel to the laser junction. The slit should be approximately 2 mm by 0.5 mm. Preferably the lens should have a total aperture of 5 mm.

The laser 20 is aligned in the horizontal plane and set up to give a beam of about 20° divergence in the horizontal plane and 6° divergence in the vertical plane.

The output of amplifier 26 leads into the threshold circuit 25 which passes the signal on to the high frequency counter and timer 24 only if it is above a predetermined threshold level. This feature serves to discriminate against noise and signals from cars in other lanes.

Pulse generator 22 of FIG. 2 runs at the repetition rate of the system. The pulse generator triggers the modulator 21 which is a capacitator discharge circuit that drives the laser 20. At the same time, a high frequency counter and timer 24 is started by a signal from the pulse generator 22. The high frequency counter should have a range of approximately 100 megahertz to 1 gigahertz. If a return signal is received in the proper time frame to be coming from a leading car, this return signal stops the counter timer 24. As an example, the proper time frame for a car in the range 5–100 meters ranges from 33 to 667 nanoseconds. The distance to the leading car is then the measured time interval multiplied times the velocity of light. At the next pulse generator pulse the high frequency counter is reset and the process is repeated. The pulse generator 22 also stops and restarts a low frequency counter 23 each time it generates a pulse. That is, the pulse generator emits a stop start pulse to the low frequency counter 23 simultaneously with the pulse to the modulator and the high frequency counter 24. The low frequency counter 23 has a rate about 100 times the pulse rate of the pulse generator 22, preferably 10 kilohertz. Each finished count of this counter is fed to the signal processor 28, along with the finished count from the high frequency counter timer 24, and a signal from an independent ground speed sensor provides a signal which indicates the ground speed of the vehicle. The processor 28 stores a new distance value from the counter timer for each pulse of the pulse generator 22. The processor 28 operates on the values of range X, time T, ground speed $V_j$ to obtain a value for the closing velocity $V_c$. The operation is indicated by the formula below:

$$V_c = \frac{X_n - X_{n-1}}{T_n}$$

wherein $X_{n-1}$ is the stored distance from the leading car from the previous pulse; $X_n$ is the distance for the present pulse, and $T_n$ is the finished count of the low frequency counter 23 when it was stopped by the present pulse of the pulse generator 22, and equals the time interval between the present and previous pulses.

Referring again to FIG. 2, it is shown that the output of the signal processor 28 may provide a signal to a visual indicator 51, sound alarm 52, or actuated automatic speed control 53. The processor may be programmed to actuate either one or all of these functions.

It should be understood that the foregoing specification was merely exemplary and that it is desired not to be limited to the exact details of construction shown and described, for obvious modifications can be made by a person skilled in the art. For example, the invention has been described with respect to automobiles; however, it is apparent that the invention can also be utilized with respect to other vehicles such as trains, buses, etc.

I claim as my invention:

1. An automobile collision avoidance system comprising:
    a. means located on the rear end of an automobile for receiving radiant energy at the frequency $f_1$;
    b. means located on the rear end of an automobile for transmitting radiant energy at the frequency $f_2$;
    c. means located on the front end of an automobile for transmitting radiant energy of a frequency $f_1$;
    d. means located on the front end of an automobile for receiving radiant energy at the frequency $f_2$;
    e. means responsive to the receipt of radiant energy at the frequency $f_2$ for determining the proper distance between a leading automobile and a trailing automobile; and
    f. means responsive to said last-named means for providing an indication to the driver that the distance is less than a predetermined minimum.

2. The system defined in claim 1 wherein said means for determining proper distance comprises a signal processor.

3. The system defined in claim 2 further comprising a speed sensor whose output is applied to said signal processor.

4. The system defined in claim 2 wherein said means for providing an indication comprises a visual or audible alarm.

5. The system defined in claim 2 wherein said means for providing an indication comprises means for actuating the automobile braking system.

* * * * *